(12) United States Patent
Anderson et al.

(10) Patent No.: US 7,874,363 B2
(45) Date of Patent: Jan. 25, 2011

(54) METHOD FOR TERMINATING OR REDUCING WATER FLOW IN A SUBTERRANEAN FORMATION

(75) Inventors: Gregory E. Anderson, Calgary (CA); William J. Heaven, Calgary (CA)

(73) Assignee: Renelco Energy Inc., Calgary, Alberta (CA)

( * ) Notice: Subject to any disclaimer, the term of this patent is extended or adjusted under 35 U.S.C. 154(b) by 0 days.

(21) Appl. No.: 12/087,058

(22) PCT Filed: Jan. 8, 2008

(86) PCT No.: PCT/CA2008/000018

§ 371 (c)(1), (2), (4) Date: Jun. 25, 2008

(87) PCT Pub. No.: WO2008/083468

PCT Pub. Date: Jul. 17, 2008

(65) Prior Publication Data

US 2009/0260813 A1    Oct. 22, 2009

(30) Foreign Application Priority Data

Jan. 9, 2007 (CA) .................................. 2573503

(51) Int. Cl.
*E21B 43/22* (2006.01)
*E21B 43/27* (2006.01)

(52) U.S. Cl. .................. 166/300; 166/281; 166/305.1; 166/307; 166/371; 166/402

(58) Field of Classification Search ...................... None
See application file for complete search history.

(56) References Cited

U.S. PATENT DOCUMENTS 5,094,762 A * 3/1992 Lahalih ...................... 507/117

FOREIGN PATENT DOCUMENTS

| CA | 1277936 | 12/1990 |
|---|---|---|
| GB | 2062070 | 5/1981 |
| WO | WO2004104368 | 12/2004 |
| WO | WO2005040551 A1 | 5/2005 |
| WO | WO2006037959 A1 | 4/2006 |

* cited by examiner

*Primary Examiner*—Zakiya W. Bates
(74) *Attorney, Agent, or Firm*—Arne I. Fors

(57) ABSTRACT

A method of conditioning well bores and reducing the deleterious effects of water production in a subterranean formation by placing an aqueous phase polymer and/or resin, which at a designated set up time, solidifies and blocks water conduits and establishes post treatment gas and oil permeability. Novel polymers and/or resins for use as a water barrier are typified by phenolformaldehyde containing 1-2 weight % of at least one of sodium bisulphite, sodium metabisulphite or mixtures thereof. The method includes selecting a well having sizable hydrocarbon reserves with a production history of decrease of oil or gas production with concurrent increase of water production.

20 Claims, 3 Drawing Sheets

METHOD FOR TERMINATING OR REDUCING WATER FLOW IN A SUBTERRANEAN FORMATION

BACKGROUND OF THE INVENTION (i) Field of The Invention

This invention pertains to a method for shutting off or reducing the unwanted production of water from wells in a gas and oil-bearing formation due to flow through paths of least resistance.

(ii) Description of the Related Art

In the operation of wells used in the recovery of gases and associated liquids from subterranean formations unwanted passage of water can severely disrupt or in fact terminate the desired operation of a well. Frequently, a hydrocarbon reservoir contains water, either due to indigenous water or injected water. In oil wells, water bypassing is often observed since the mobility of the water is usually high and therefore, when a pressure gradient is imposed, water tends to flow more readily than the oil. In gas wells, mobile water migrates to the well bore. and is either produced and/or accumulates. If it accumulates, it will reduce the permeability to gas (aqueous phase trap) thereby reducing or shutting off production. In addition, this water can kill the gas flow in the well when the hydrostatic pressure of the water column is greater than the reservoir pressure. The effects of water production are deleterious, as the water must be separated from saleable hydrocarbon products and disposed of in an environmentally safe manner. This can result in the well being shut in because of the adverse economics of increased separation and disposal costs of water compared to the declining hydrocarbons as water flow increases. Artificial lifting costs to handle the water can add substantially to the cost of production.

These problems are not unique and the solutions have traditionally involved apparatus, methods, and compositions adapted to cover, seal or otherwise plug the openings thereby shutting off or reducing the passage of water. A barrier often is considered for unwanted liquid and gas production mitigation. There are a number of articles and patents describing various techniques which have been used to reduce water production due to coning or bottom water flow. Examples of these are Karp. et al., Horizontal Barrier for Controlling Water Coning, Journal of Petroleum Technology, Vol. XX, pp. 783-790, 1962, Canadian Patent No. 1,277,936 to Costerton et al. and U.S. Pat. No. 5,062,483 issued to Kisman and Russell. These patents and the article discuss specific methods for isolation of bottom water flow. Polymers and resins, such as polyacrylamide and polyphenolic resins, have been used in the past to enter the water conduits in the reservoir, and at a predefined time, setup or solidify to block or substantially impede water flow in the conduits. Since these solutions are aqueous they have a preference for the water conduits because of the low interfacial tension between two aqueous fluids. This can result in the aqueous solution mixing with the large volumes of water and becoming unduly diluted.

These treatments have been successfully used for plugging high water flow regions but, due to their density, many times these treatments are gravimetrically unstable and are therefore less effective for bottom water control. Some of these previous applications are described in U.S. Pat. Nos. 4,683, 949; 5,358,043; 5,418,217; 4,744,418; 5,338,465; 4,844,168 and 3,884,861.

Another technique disclosed in U.K. Patent GB 2,062, 070A proposed a viscosified polymer which would be emulsified in oil and injected into a gas-producing formation to control bottom water production. This, however, was not successful due to the fact that the inherently high viscosity precluded the polymer from entering into many of the zones in which the water was flowing. Also, polymer gel emulsified in oil and stabilized with surfactants often suffer from phase separation in porous media.

SUMMARY OF THE INVENTION

It is a principal object of the present invention to placing a novel water-blocking agent on top of or near the top of an oil-water or gas-water interface in a reservoir where the hydrocarbon phase (oil and/or gas) is underlain by a bottom water zone.

It is another object of the invention to condition a well-bore and to control injection parameters during placement of a water-blocking agent whereby the water-blocking agent can be effectively placed in the conduits (fractures, wormholes, high permeability streaks, near well-bore deficiencies, etc.) to prevent water to migrate to the well-bore from aquifers above, below and from the edge of a production zone.

It is an objective of this invention to provide ease of injection into production or injection wells and therefore the water-blocking agent must be controlled as a liquid phase, thus a further object of the invention is the provision for low viscosity of the chemical during placement and, upon appropriate placement and setup time, high-viscosity to reduce water flow, particularly to block water flow vertically or through thief zones.

And it is another object of the invention to selectively choose wells having desirable production characteristics for optimum economic returns.

The invention has advantages whereby, in using available water and crude oil or any designated liquid hydrocarbon phase of a specific density, the overall density of the chemical treatment can be adjusted so that the treatment floats on water and has a modified or unmodified viscosity as well. Another advantage of the invention is that by controlling the differential pressure to inject the water-blocking agent, capillary forces in both the oil- and water-bearing portions of the rock are overcome so that the block can be selective in the water conduits of the hydrocarbon reservoir. When these blocks set up or solidify, the unwanted water production is shut off or reduced.

The challenge thus is to selectively place these treatments without adversely affecting the relative permeability of the reservoir for gas or oil production and without invading the hydrocarbon zones. This can be accomplished in one embodiment of the invention for gas wells with or without oil by the injection of water and a gas such as nitrogen gas before the polymer is injected downhole, and in some cases utilization of a liquid solvent such as methanol and/or water, or by injection of a gas such as nitrogen gas before and after the polymer is injected downhole. By following the protocol as will be described, not only is water production reduced or shut off but also any risk associated with blocking off or restricting the flow of gas or oil is minimized. This can be accomplished in another embodiment of the invention by placing an emulsion (with a density intermediate the oil phase and water phase so it floats) of the interface between the oil production zone and the underlying aquifer. This will stop or reduce the water from coming up from below. These embodiments will optimize the post treatment production by ensuring the gas and oil permeability is maintained and potentially improved while minimizing or blocking waterflow.

We have found that selection of a well having an initial production history of oil and/or gas, with sizable remaining reserves, and a subsequent concurrent decrease of gas or oil production and increase of water production, offers optimum prospects of successful treatment.

The injection rate of the water-blocking agent and its injection pressure are critical for successful treatment of a well. The injection of the water-blocking agent at a rate above 200 liters/minute (L/min), regardless of production rates, at an injection pressure differential ($\Delta P$) between the injection pressure at targeted formation and the reservoir pressure (ambient pressure) of 2 to a maximum of 5 mega pascals (MPa), ensures that the water-blocking agent selectively fills and blocks water-filled passageways without blocking oil or gas permeability.

An aqueous solution of a polymer such as phenolformaldehyde sold under the trade-mark DIREXITTP™, containing 1-2 weight % of at least one of sodium bisulphite, sodium metabisulphite and mixtures thereof additionally containing 10 weight % anhydrous sodium sulphate, has a low initial viscosity with gelation over a predetermined time interval can be injected into the formation, particularly fractured carbonate and sandstone formations. A polymer gel-in-oil emulsion of this polymer, which is lighter than water, floats on the water and provides an effective water barrier at the water-hydrocarbon interface to control water coning in oil wells producing from partially consolidated or unconsolidated sandstones.

Another polymer gel having a relatively low initial viscosity with gelation over a predetermined period of time is polyacrylamide sold under the trade-mark ALOFLOOD 2545®, which can be injected into the formation as a polymer gel-in-oil emulsion lighter than water.

A further polymer gel-in-oil emulsion comprises a polymer formed from a 1,2-substituted ethene compound such as a substituted styrlpyridinium compound sold under the trade-mark HYDRAGEL™ and described in published U.K. Patent Application Serial No. 96 194 19.6, preferably injected into the formation as a gel-in-oil emulsion.

In its broad aspect, the method of the invention for placing an aqueous polymer in the water conduits of the production zone of a gas or oil reservoir to form a barrier to shut off or reduce unwanted production of water, through a well-bore tubing and/or annulus in communication with the production zone of the gas or oil reservoir, comprises injecting water into the production zone to establish an injection rate into the production zone of at least 200 L/sec., and injecting the aqueous polymer into the production zone at said injection rate, the preferred aqueous polymer being phenoformaldehyde containing 1-2 weight % of at least one of sodium bisulphite, sodium metabisulphite, and mixtures thereof additionally containing 10 weight % anhydrous sodium sulphate. The aqueous polymer can also be injected as an aqueous oil-in-water polymer emulsion.

In accordance with another aspect of the invention, the method for placing an aqueous polymer gel in the water conduits of the production zone of a gas or oil reservoir to form a barrier to shut off or reduce unwanted production of water, through a well-bore tubing and/or annulus in communication with the production zone of the gas or oil reservoir, comprises injecting water into the production zone to establish an injection rate into the production zone of at least 200 L/min, injecting $N_2$ or $CO_2$ gas into the formation in a first gas injection to displace the water or flush the water to surface with $N_2$ or $CO_2$ in an amount sufficient to displace the water, injecting the aqueous polymer gel into the production zone at said injection rate, at a pressure in the range of 2 to 5 MPa above the formation ambient pressure, and injecting $N_2$ or $CO_2$ gas in a second gas injection to optimize gas permeability in the production zone. The method preferably comprises ascertaining the $N_2$ or $CO_2$ first gas injection rate while injecting gas into the formation to displace the water, monitoring the $N_2$ or $CO_2$ second gas injection rate, comparing the $N_2$ or $CO_2$ gas first injection rate with the $N_2$ or $CO_2$ second injection rate, and increasing the $N_2$ or $CO_2$ gas second injection rate to match the $N_2$ or $CO_2$ first injection rate to re-establish and optimize the gas permeability in the production zone.

The aqueous polymer gel can be emulsified with up to 50 weight % oil and stabilized with a surfactant.

In accordance with the preferred embodiment of the invention, a well is selected in which the wells oil or gas production decreased concurrent with an increase in water production, said well having indicated sizable reserves of oil or gas.

In accordance with another embodiment, by incorporating at least a two-stage sequential treatment, larger conduits of water flow may be blocked upon injection of a first horizontal stage whereas a second stage will serve to impede undesirable fluid flow (water or gas) from the secondary flow conduits. Moreover the second stage of the treatment has a lower vertical limit provided by a generally horizontal barrier down through which the second stage will not pass. This would have specific application to treatments where the second stage has a specific gravity higher than 1.0 but this layered approach would also be very effective for systems where the second or subsequent stages are less or more dense than water.

The invention describes novel composition which is gravimetrically stable with respect to the oil-water or gas-water contact and will form a first stage of a water impermeable solid or gel phase, preferably followed by a second stage which will be largely independent of specific gravity considerations and which will complement the first stage. By designing the viscosity and density of the treatment, vertical flow of undesirable phases can be reduced and flow from thief zones can also be targeted.

It has been found that hydrophilic clays present in sand stone production zones can block injection of aqueous polymers to swelling of hydrophilic clays upon contact with water. A further embodiment of the invention includes adding a clay stabilizer, typified by cholin chloride or potassium chloride, to the treatment and injecting to obviate swelling of clays and thereby maintaining zone permeability.

BRIEF DESCRIPTION OF THE DRAWINGS

The method of the invention will be described with reference to the accompanying drawing, in which.

DESCRIPTION OF THE PREFERRED EMBODIMENT

Figure 1:
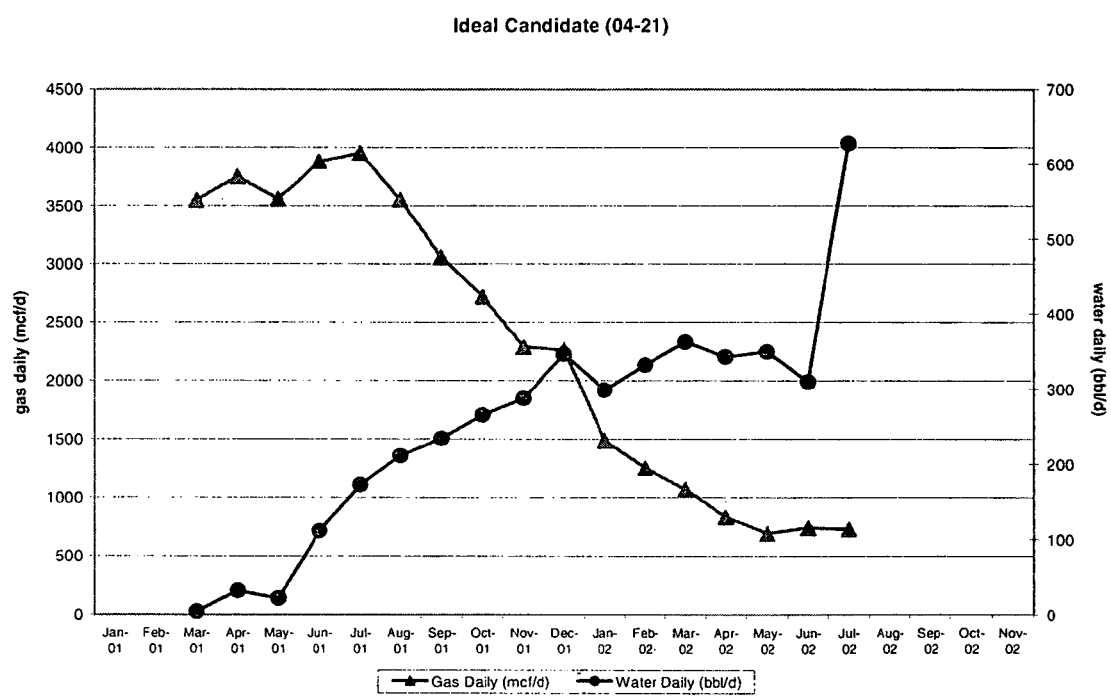
FIG. 1 is a graph showing a production profile of a suitable candidate well for application of the process of the invention.

A basic requirement of the process of the present invention for the successful remediation of a gas or oil well is a production history that shows a time during which the well primarily produced oil or gas, such as typified in the production history shown in FIG. 1. In order to significantly impact a well's production performance, a correlation must exist of increased water production concurrent with decreased oil or gas production. This will indicate that the reason for current production difficulties originates with and is tied to a marked increase in water production, and not to depletion of hydrocarbon reserves.

A requirement of the present invention, pertaining to shutting off or reducing water production where water is coning up to the production perforations, through partially consolidated or unconsolidated sands, is that the density of the aqueous polymer phase must be greater than that of the hydrocarbon, i.e. oil or liquified gas, and less than that of the formation water. By injecting this intermediate-density phase into the reservoir, it will necessary settle due to gravity to the point where it sits on top of the water. By appropriate design of the properties of the aqueous polymer (density and control of viscosity) the treatment can also be specifically placed in high permeability layers or zones. Once in place, the setup time mechanism must be such that it gels or becomes a solid phase and thereby offers significant resistance to unwanted gas or water (or any other undesirable phase) production in the region of the near well-bore or where the coning response exists. The aqueous polymer phase must have the properties that it has adequate setup time, adequate rigidity and that the viscosity is such that it will flow easily into various types of rock. The treatment is possible to be placed both from the current production perforations as well as perforations which may be newly created.

The aqueous component of the invention would include a polymer which has been designed at a specific concentration for setup time which is consistent with the physical situation. The composition of the aqueous polymer phase of the emulsion can be those of a polyacrylamide and cross-linking nature such as disclosed in U.S. Pat. No. 4,693,949, No. 5,358,043 or No. 5,418,217 and the compositions of the phenol formaldehyde as exemplified in the U.S. Pat. Nos. 3,884,861 and 4,091,868 or Canadian Patent No. 1,187,404. The oil component can be a refined oil including diesel, mineral oil, benzene, kerosene or the like. Crude oils can also be used but preferably a refined oil products with lower densities should be used from a density perspective. A small amount of surfactant usually is required to stabilize emulsions.

A preferred polymer is phenolformaldehyde sold under the trade-mark DIREXIT™, containing 1-2 weight % of at least one of sodium bisulphite, sodium metabisulphite and mixtures thereof additionally containing 10 weight % anhydrous sodium sulphate. The presence of the sodium bisulphite, sodium metabisulphite and mixtures thereof additionally containing 10 weight % anhydrous sodium sulphate has been found to be critical for delay of viscosity set up for an adequate time to enable flow of the aqueous polymer to the desired site.

Figure 2:
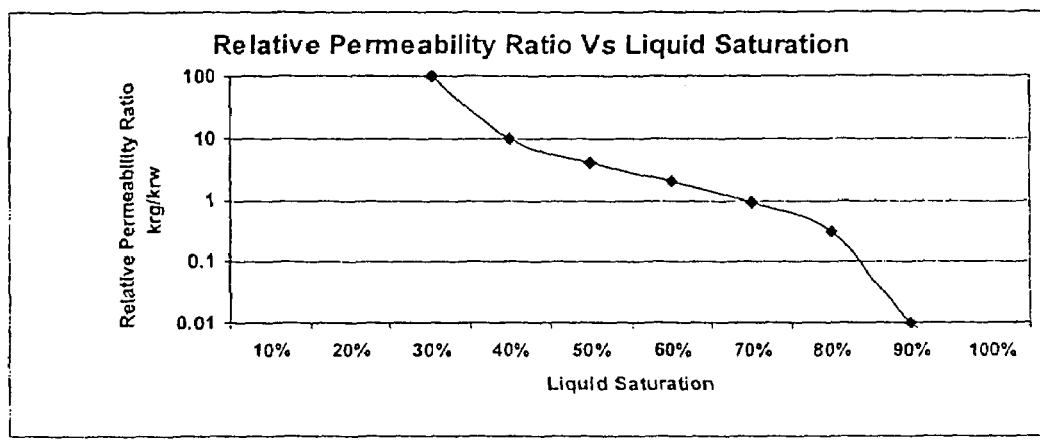
FIG. 2 is a graph illustrating relative permeability to liquid saturation in a gas-bearing reservoir.

There are many challenges to overcome in properly placing an aqueous solution in a reservoir to shut off or reduce water migration to the production perforations in a producing well, such as a producing gas well with or without oil production. Before proceeding with an application of the aqueous solution, an injection rate for water should be established first to ascertain whether the polymer or resin could be safely injected into the subterranean formation under pressure and time limitations. The well may have to be stimulated in order to increase the injection rate. The problem with this injection test is that the water saturation in the near well bore region can increase due to the water injection and, as a consequence, reduce the relative permeability of gas. As a result the gas flow can be reduced, or in fact, shut off. FIG. 2 illustrates how the increase in water saturation affects the relative permeability of gas. To overcome these problems, gas ($N_2$ or $CO_2$) should be injection into formation, after the injection test with water is complete, to displace the water and to re-establish the gas saturation and the conduits to the gas zone.

Another possible problem is that the water used in the injection test can charge up the reservoir, i.e. fill with large voids so more pressure is required to inject the subsequent polymer and/or resin into the reservoir. The increase in pressure can force the polymer into the gas zone if the increase in differential pressure ($\Delta P$) overcomes the capillary pressure keeping the aqueous solution out of the gas zone. To overcome this problem, the water used for the injection test can be flushed to surface using gas ($N_2$ or $CO_2$). The gas is injected down the casing annulus and the water is flushed back through the tubing, or vice-versa. This water can also be swabbed back to surface. If a permanent packer to isolate the tubing from the casing is in place, coil tubing can be used to perform this task. If coil tubing or swabbing is not an option, after the feed rate with water is performed wait at least 48 hours to allow the pressure in the reservoir to reach the equilibrium before doing the application. Once the water is displaced, a feed rate for gas should then be established. A gas such as nitrogen gas ($N_2$), carbon dioxide ($CO_2$), or the like gas is then injected. The volume of gas, e.g. $N_2$, will be calculated to flush all the fluids out of the tubing and/or annulus and to establish gas saturation and to ensure permeability in the near well bore matrix.

The presence of fine clays in proximity to the well bore due to migration of the clay fines during production towards the bore may plug permeability and impede the flow of the water-blocking agent. A pressure increase during injection of the $N_2$ or $CO_2$ gas in excess of 2-5 MPa, for example a pressure increase in the range of 6 to 10 MPa, indicates plugged permeability by the clay fines. Permeability often can be restored by injecting 1-10 cubic meters (cubes) of hydrofloric acid followed by flushing with $N_2$ gas.

This same type of problem can occur in carbonate wells where the injection test for water is <200 liters per minute at differential pressure $\Delta P$ at surface of 6 to 10 MPa. This can be the result of the natural low permeability of the formation or the buildup of scale. Permeability can be increased and/or be restored by injecting one to ten cubic meters (cubes) of hydrochoric acid followed by one cube of water and displaced into the formation with $N_2$.

With the permeability assured, the subsequent aqueous treatment will then benefit from capillary pressure selectivity in addition to permeability contrasts to drive the aqueous phase treatment into the region where the water is flowing. Once the treatment is injected, a gas such as $N_2$ is injected to ensure gas permeability is maintained in order to optimize post treatment gas production.

A description of an exemplary field test of the method of the invention is as follows.

Field Test Summary for Shutting Off or Reducing Water Production in Gas Well

1. Connect the aqueous polymer mixing and pumping unit along with a gas (e.g. $N_2$ or $CO_2$) pumping unit to well head.
2. Ascertain the injection rate $m^3$/minute for an aqueous solution such as phenolformaldehyde by first injecting reservoir compatible water into the formation to ensure there is adequate flow rate and time (including a margin of safety) to inject the volume of resin and/or polymer before it sets up. The reservoir may need to be stimulated to achieve a fluid injection rate of at least 200 L/min. at a $\Delta P$ of 5-10 MPa.
3. The water used in the injection test in Step 2 can be flushed or swabbed back to surface or forced into the reservoir using gas (e.g. $N_2$ or $CO_2$).
4. Ascertain the injection rate ($m^3$/minute) of gas (e.g. $N_2$ or $CO_2$) at STP to ensure all liquids are cleared from wellbore and to establish gas conduits into the reservoir formation. This rate can be compared to the injection rate of the gas after the polymer has been displaced to help determine if gas permeability has been reduced.

5. Mix the programmed volume and concentration of aqueous polymer.
6. Precede the polymer in step 5 with the programmed volume of water, usually 1 cubic meter, to ensure the aqueous polymer does not plug off the gas permeability. In many cases the injection pressure increases when the aqueous fluid first enters the formation and this can force the liquid into the gas zone until the conduits to the aquifer are established. It is much preferred this liquid is water rather than the polymer which once set will reduced the post treatment permeability to gas.
7. Follow the water with injection of the mixed aqueous polyer solution, ensuring that the rates are as low as possible and are still able to safely place/displace solution into the formation before it sets. (Ensure surface pumping pressure added to the hydrostatic pressure does not exceed the fracture pressure of the reservoir).
8. Follow the aqueous polymer with about 1 $m^3$ of water and the programmed volume of $N_2$ or $CO_2$ to ensure the perforations are clear of the displaced aqueous polymer to access the gas zone of the reservoir.
9. Follow Step 8, with the programmed volume of gas to not only ensure the aqueous polymer is displaced from the well-bore but also confirm communication is established to the gas zone. (This can be monitored by surface pressure since the downhole pressure and temperature are known). This gas can be continuously injected until the polymer has set to ensure gas permeability is maintained.
10. If the initial post treatment injection rate for gas has been reduced significantly by comparison with the rate achieved in Step 4, the injection rate of the gas (e.g. $N_2$ or $CO_2$) can be increased to help re-establish the gas permeability and/or an acid treatment can be performed in the hydrocarbon zone.
11. Shut in the well for 12 hours or until it can be assured that the aqueous polymer is set.

Step by Step Field Test Summary for Shutting Off or Reducing Water Production in an Oil Well 1(a) If displacing the polymer through existing perforations, set a packer (retainer) above the production perforations and ascertain an injection rate ($m^3$/minute) with water through these perforations into the formation to ensure there is adequate time (including a margin of safety) to inject the designed volume of polymer before it sets up. The reservoir may need to be stimulated to achieve the desired rate.

1(b) If displacing the polymer at, or just above the oil water contact, then perforate this interval; set a packer (retainer) above these perforations and ascertain the injection rate ($m^3$/minute) with reservoir compatible water through these perforations into the formation to ensure there is adequate time (including a margin of safety) to inject the designed volume of polymer before it sets up. The reservoir may need to be stimulated to achieve the desired rate. If the well has been completed and there are perforations above the packer (retainer) in the oil production zone then trickle oil into these production perforations through the annulus to ensure the fluids injected through the bottom perforations do not migrate upwardly above the water/oil interface.

2. Connect the aqueous polymer mixing and pumping unit along with the oil pumping unit if require (Step 1(b) above) to the well head.

3. Mix the programmed volume and concentration of an aqueous polymer of the invention.
4. Place the polymer to the bottom of the tubing, 1(a) activate the retainer and shut in the annulus, then displace the aqueous polymer into the reservoir formation, ensuring the surface pressure added to the hydrostatic pressure of the column of fluids does not exceed the reservoir fracture pressure. Under displace the polymer, deactivate the retainer and backwash the under displaced polymer to surface. 1(b) fill the well with crude oil, then place the polymer to the bottom of the well-bore tubing, activate the packer (retainer) and displace the aqueous polymer into the formation while keeping positive pressure on the annulus so as to trickle oil through the production perforations. Under displace the aqueous polymer, deactivate the retainer and backwash the aqueous polymer to surface.
5. Shut in the well for along enough period to ensure the polymer has set (usually 12 hours).

The method of the invention will now be described with reference to the following non-limitative example, in which the aqueous polymer is phenolformaldehyde (DIREXIT™), containing about 1.5 weight % of a mixture consisting of about 45% sodium bisulphite, about 45% sodium metabisulphite, and about 10% anhydrous sodium sulphate.

Figure 3:
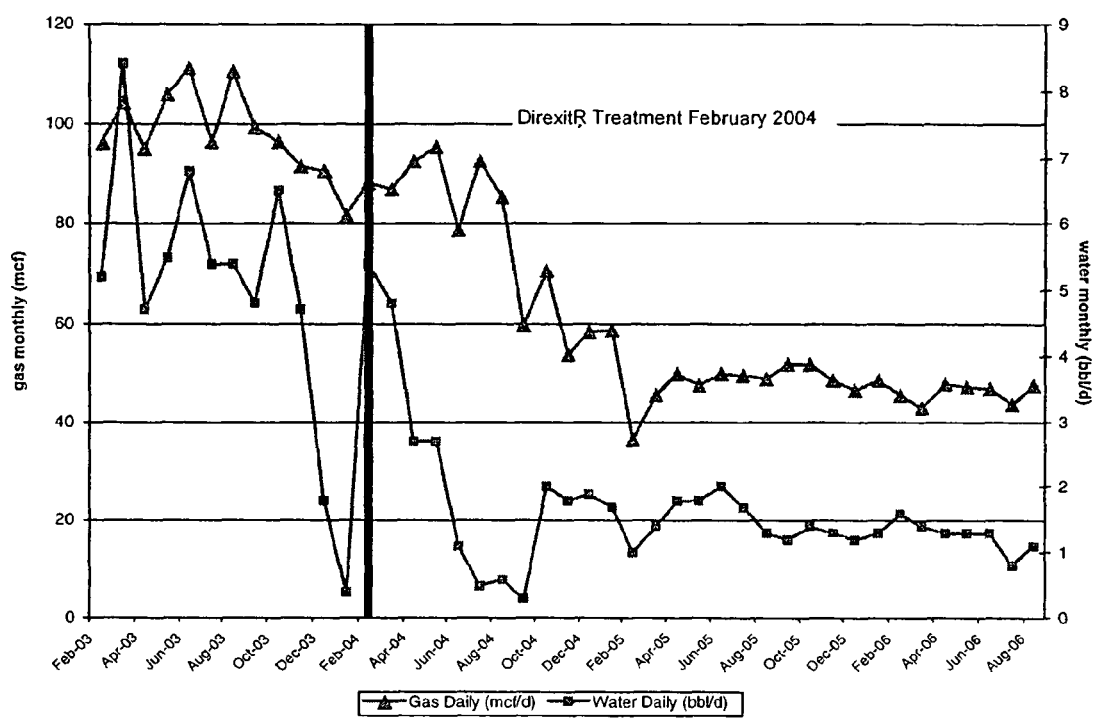
FIG. 3 is a graph, of Case 1, showing daily gas and water production after application of the method of the invention.

Case 1: Water Shut Off-Gas (FIG. 3)

| | |
|---|---|
| Volume of Treatment | 2.04 m3 |
| Formation Type | Sandstone |
| Work-over Report | Pumped 2.1 m3 at a rate of 200 l/min with pumping pressure of 1,200 kPa to block water production from induced fractures. |
| Result | As soon as these tight sandstone wells are fractured to induce gas production, water overwhelms the well and it is unable to produce gas or water. Following the Direxit treatment, the water production rate was cut in half, and the well has been on full time production since the treatment. |

The present invention provides a number of important advantages. By using phenoformaldehyde containing 1-2 weight % sodium bisulphite/sodium metabisulphite as an aqueous polymer, a barrier is formed which, once set or gelled, effectively blocks water flow from coning up into the production perforations of the well. Also, by controlling the differential pressure ($\Delta P$) to inject the polymer, capillary forces in the oil, gas and water-bearing portions of the rock are overcome while maintaining permeability so that the block can be total.

It will be understood, of course, that modifications can be made in the embodiment of the invention illustrated and described herein without departing from the scope and purview of the invention as defined by the appended claims.

We claim:

1. A method for placing an aqueous polymer in the water conduits of the production zone of a gas or oil reservoir to form a barrier to shut off or reduce unwanted production of water, through a well-bore tubing and/or annulus of a well in communication with the production zone of the gas or oil reservoir, comprising:

injecting water into the production zone to establish an injection rate into the production zone of at least 200 L/min., and injecting the aqueous polymer into the production zone at said injection rate, said aqueous polymer comprising phenolformaldehyde containing 1-2 weight % of at least one of sodium bisulphite, sodium metabisulphite and mixtures thereof additionally containing 10 weight % anhydrous sodium sulphate.

2. A method as claimed in claim 1, in which the aqueous polymer is injected at a pressure differential in the range of 2 to 5 MPa above ambient pressure of the production zone.

3. A method as claimed in claim 2, in which aqueous polymer is emulsified with up to 50 weight % oil as an aqueous oil-in-polymer emulsion.

4. A method as claimed in claim 2, injecting an effective amount of concentrated hydrofloric acid or hydrochloric acid sequentially with $N_2$ gas to restore permeability prior to injection of the aqueous polymer if the pressure differentiation is above 5 MPa, and water flushing the hydrofloric acid or hydrochloric acid.

5. A method as claimed in claim 4, in which the concentrated hydrochloric acid is injected in an amount of 1-10 cubes at a rate of 200 L/min. with 25 cubes of $N_2$ gas at STP, and the hydrochloric acid is flushed with one cube of water followed by $N_2$ or $CO_2$ gas.

6. A method as claimed in claim 5, in which aqueous polymer is emulsified with up to 50 weight % oil as an aqueous oil-in-polymer emulsion.

7. A method as claimed in claim 4, in which the concentrated hydrofloric acid is injected in the amount of 1-10 $m^3$ at a rate of 200 L/min. followed by 25 $m^3$ of $N_2$ gas at STP, and the hydrofloric acid flushed with 1 $m^3$ of water followed by 1 $m^3$ of $N_2$ gas.

8. A method as claimed in claim 7, additionally comprising pre-selecting a well which has a sizable gas or oil reservoir and in which oil or gas production has decreased concomitant with an increase in water production.

9. A method as claimed in claim 8, in which the hydrochloric acid is injected in an amount of 1 to 10 10 $m^3$, at a rate of 200 L/min. followed by 2 $m^3$ of water and followed by 25 $m^3$ of $N_2$ gas at STP.

10. A method as claimed in claim 8, injecting an effective amount of concentrated hydrofloric or hydrochloric acid sequentially with $N_2$ gas to restore permeability prior to injection of the aqueous polymer if the pressure differentiation is above 5 MPa, and water flushing the acid.

11. A method as claimed in claim 8, in which the phenolformaldehyde contains 1-2 weight % of a mixture consisting essentially of 45% sodium bisulphite, 45% sodium metabisulphite and 10% anhydrous sodium sulphate.

12. A method as claimed in claim 1, in which the phenolformaldehyde contains 1-2 weight % of a mixture consisting essentially of 45% sodium bisulphite, 45% sodium metabisulphite and 10% anhydrous sodium sulphate.

13. A method for placing an aqueous polymer comprising phenolformaldehyde containing 1-2 weight % of a mixture consisting essentially of sodium bisulphite, sodium metabisulphite and mixtures thereof additionally containing 10 weight % anhydrous sodium sulphate, in the water conduits of the production zone of a gas or oil reservoir to form a barrier to shut off or reduce unwanted production of water, through a well-bore tubing and/or annulus of a well in communication with the production zone of the gas or oil reservoir, comprising:

injecting water into the production zone to establish an injection rate into the production zone of at least 200 L/min. at a pressure differential in the range of 2 to 5 MPa above ambient formation pressure, injecting $N_2$ or $CO_2$ gas into the formation in a first gas injection in an amount sufficient to displace the water or flushing the water to surface with $N_2$ or $CO_2$ in an amount sufficient to displace the water, injecting the aqueous polymer into the production zone at said established injection rate, injecting $N_2$ or $CO_2$ to displace the aqueous polymer from the well bore into formation, to establish communication to the gas zone and to optimize gas permeability in the production zone.

14. A method as claimed in claim 13, additionally ascertaining the $N_2$ or $CO_2$ first gas injection rate while injecting gas into the formation to displace the water, monitoring the $N_2$ or $CO_2$ second gas injection rate, comparing the $N_2$ or $CO_2$ gas first injection rate with the $N_2$ or $CO_2$ second injection rate, and increasing the $N_2$ or $CO_2$ gas second injection rate to match the $N_2$ or $CO_2$ first injection rate to re-establish and optimize the gas permeability in the production zone.

15. A method as claimed in claim 14, in which the aqueous polymer is injected as aqueous oil-in-polymer emulsion.

16. A method as claimed in claim 15, in which the aqueous polymer is emulsified with up to 50 wt % oil.

17. A method as claimed in claim 14, injecting an effective amount of concentrated hydrofloric or hydrochloric acid sequentially with $N_2$ gas to restore permeability prior to injection of the aqueous polymer if the pressure differentiation is above 5 MPa, and water flushing the acid.

18. A method as claimed in claimed 17, in which 1 to 10 $m^3$ of hydrofloric acid is injected at a rate of 200 L/min. followed by 1 $m^3$ of water and followed by 25 $m^3$ of $N_2$ gas at STP.

19. A method as claimed in claim 14, in which the aqueous polymer is injected as aqueous oil-in-polymer emulsion.

20. A method as claimed in claim 13, additionally comprising pre-selecting a well which has a sizable gas or oil reservoir and in which oil or gas production has decreased concomitant with an increase in water production.

\* \* \* \* \*